United States Patent [19]
Greenhill

[11] Patent Number: 6,141,603
[45] Date of Patent: Oct. 31, 2000

[54] ROBOT FOR OPERATING MOTOR VEHICLE CONTROL

[75] Inventor: Robert John Greenhill, Severnstoke, United Kingdom

[73] Assignee: FKI Engineering PLC, Halifax, United Kingdom

[21] Appl. No.: 09/028,170

[22] Filed: Feb. 23, 1998

[30] Foreign Application Priority Data

Feb. 25, 1997 [GB] United Kingdom .................... 9703921

[51] Int. Cl.$^7$ .................................................. G01M 15/00
[52] U.S. Cl. ............................. 700/245; 73/117; 318/587
[58] Field of Search .................................. 700/245, 260;
701/51.1, 5, 70; 318/568.1, 568.11; 901/3.5;
29/407

[56] References Cited

U.S. PATENT DOCUMENTS

| | | | |
|---|---|---|---|
| 4,393,695 | 7/1983 | Marshall et al. ........................ | 73/117.3 |
| 5,363,027 | 11/1994 | Noguchi ............................... | 318/568.1 |
| 5,372,035 | 12/1994 | Ogawa et al. .......................... | 109/49.5 |
| 5,394,743 | 3/1995 | Noguchi et al. ......................... | 701/70 |
| 5,396,792 | 3/1995 | Kohsaka et al. ........................ | 701/1 |
| 5,987,726 | 11/1999 | Akeel ................................. | 29/407.08 |

FOREIGN PATENT DOCUMENTS 0236518  3/1986  European Pat. Off. .

*Primary Examiner*—William Grant
*Assistant Examiner*—Kidest Bahta
*Attorney, Agent, or Firm*—Marshall, O'Toole, Gerstein, Murray & Borun

[57] ABSTRACT

A robot for operating at least a gear shift lever of a motor vehicle includes a base adapted to be mounted in a substantially fixed position in the vehicle and a shift member is movably supported relative to the base and adapted to engage the gear shift lever. An actuating element moves the shift member and a programmable control unit controls the operation of the actuating element. Load cells measure the forces exerted between the shift member and the gear shift lever and provide corresponding output signals representing the forces. The programmable control unit uses the output signals representing the force measurement in the course of causing the operation of the actuating element.

14 Claims, 4 Drawing Sheets

ROBOT FOR OPERATING MOTOR
VEHICLE CONTROL

BACKGROUND OF THE INVENTION

Field of the Invention

This invention relates to a robot for operating at least one driving control, namely a gear shift lever, of a motor vehicle.

Some testing of motor vehicles requires a control or controls of the vehicle to be repeatedly operated in a predetermined sequence, which generally is intended to simulate driving of a vehicle possibly for an extended time or distance. Testing for performance and/or durability might involve the setting up of a vehicle on a chassis dynamometer of "rolling road" type, and then simulating driving of the vehicle by performing a predetermined sequence of operations of the accelerator, brake, clutch and gear shift lever (in the case of a vehicle having manually-shifted gearbox). There have been various proposals for robot devices whereby the operation of the aforementioned driving controls of a vehicle can be caused to take place in a predetermined sequence, thereby eliminating the need for a person to be in attendance to operate the controls.

SUMMARY OF THE INVENTION

It is broadly the object of the present invention to provide an improved robot for operating at least a gear shift lever of a motor vehicle, for simulating driving of the vehicle.

According to one aspect of the present invention we provide a robot for operating at least a gear shift lever of a motor vehicle, comprising:

a base adapted to be mounted in a substantially fixed position in the vehicle;

a shift member movably supported relative to the base and adapted to engage the gear shift lever, for moving the gear shift lever in a gear shift pattern including components of movement in two directions substantially orthogonal to one another;

actuating means for causing the shift member to move in a pattern of movement corresponding to said gear shift pattern and including components substantially in said two directions;

programmable control means for causing said actuating means to be operated in a predetermined manner to cause a predetermined sequence of gear shifts; and means for measuring the force exerted between the shift member and the gear shift lever in each of the two directions of said components of movement of the shift member and for providing output signals representing said forces;

wherein said control means utilises said output signals in the course of causing said operation of the actuating means.

Said means for measuring the forces exerted between the shift member and gear shift lever in said two directions may comprise means arranged to measure corresponding force components in a member connecting the shift member to the actuating means.

Conveniently such force-measuring means comprises a load cell or cells, e.g. of strain gauge type, appropriately disposed on or in relation to said connecting member.

In all modern vehicles known to the applicant and with which a robot in accordance with the invention is intended to be used, the path in which the gear shift lever has to be moved to select the required gears is a "gate" which includes a portion extending transversely of the vehicle and in which no gears are selected, movement of the lever in this part of the path accordingly being referred to herein as movement in the neutral plane. The lever is movable forwardly and rearwardly from the neutral plane in gear selection planes, to select required gears, such movement usually being possible at the extreme ends of the lever's movement in the neutral plane and from a mid-position in the neutral plane. At one extremity, usually the left-hand end of the lever's movement in the neutral plane, forward movement of the lever selects first gear and rearward movement of the lever from the neutral plane selects second gear, although in some vehicles reverse gear is situated beyond the gear selection plane of first and second gears. In the midposition of the neutral plane, forward movement of the lever selects third gear and rearward movement from the neutral plane selects fourth gear. At the right hand end of the path of movement of the lever in the neutral plane, forward movement of the lever selects fifth gear while rearward movement from the neutral plane possibly selects reverse gear (in the case of a gearbox providing five forward gear ratios) or sixth gear (in the case of a gearbox providing six forward gear ratios; in which case reverse gear must be engaged by a different and additional lever movement). The gear lever usually is pivotally mounted at its lowermost end, so movement of the lever free end is actually an arcuate movement in each of the neutral plane and the gear selection planes, although such movement is able to be effected by a shift member movable linearly substantially in these planes.

The two directions of movement of the shift member are preferably a direction substantially transversely of the vehicle and a direction forwardly and rearwardly of the vehicle.

The actuating means may comprise first actuating means for causing movement of the shift member in the direction transversely of the vehicle, and second actuating means for causing movement of the shift member in the direction fore and aft of the vehicle. Each of the first and second actuating means conveniently comprises a screw-type device, wherein an output element movable linearly engages a lead screw element rotatable as required by an electric motor. Each such actuator may be of the ball-screw type, and have associated therewith a means for detecting the position of the output member and for providing a signal representing such position to the control means of the apparatus, to provide a position-control mechanism in accordance with generally known control techniques. The position detector may be a potentiometer, e.g. a linear potentiometer device moved by the output member of the actuator.

The base of the robot is preferably adapted to be mounted in the vehicle by being supported on the diver's seat thereof. The base may be provided with means for resting against the squab and the backrest of the seat, and may be adapted to be secured thereto by fastening means such as straps.

It will be appreciated that the driver's seat of a vehicle is to some extent resilient in order to ensure the driver's comfort, but nevertheless it provides a sufficiently firm support for the robot to react the forces which have to be exerted in operating the gear shift lever of the vehicle.

Preferably the first actuating means is disposed in the base such that the output member thereof is movable, in use, transversely of the vehicle and said output member is connected to means which supports the second actuating means which is arranged to cause movement of the shift member in the fore and aft direction of the vehicle. Preferably the support means for the second actuating means includes provision for adjustment of the position and orientation of the second actuating means in order to enable it to operate the gear lever correctly in a particular vehicle in which the robot is mounted.

The robot further may include respective actuating means for pedal controls of the vehicle. In a conventional vehicle equipped with a manual gearbox, there will be three of such further actuating means respectively for operating the accelerator, brake and clutch of the vehicle.

Preferably the pedal control actuating means comprise linear actuators which are each adjustably supported relative to the base of the robot. Such actuators are preferably each further supported at positions remote from the base so that they are able to cooperate with the pedal controls of the vehicle.

The method of operation of the robot and particularly of the control means thereof, and the manner in which it utilises the output signals from the force-measuring means, are described in greater detail hereafter. In principle, the output signals from the force-measuring means are first utilised when a robot is installed in a vehicle, and the control means has to "learn" the path of movement of the gear shift lever of vehicle to select required gears. Output signals from the force-measuring means provides clear indication of when the gear shift lever reaches the limits of its movement in the neutral plane and the gear selection planes, by virtue of a sudden increase in the measured force. The control means may record the positions of the actuating means corresponding to such force increases, and thus be able to cause the actuating means to move to such positions in the course of gear shifting to simulate driving of the vehicle. In such latter operation, the signals from the force-measuring means can be used to monitor correct selection of gears, and compensate for movement of the base of the robot relative to the vehicle due to the fact that it is mounted on a vehicle seat which inherently has a degree of resilience.

Preferably, after a gear has been selected, the control means causes the robot to assume a "zero force" condition, such that the shift member is moved to reduce to zero any force exerted thereon by the gear lever.

BRIEF DESCRIPTION OF DRAWINGS

The invention will now be described by way of example with reference to the accompanying drawings, of which.

DESCRIPTION OF PREFERRED EMBODIMENT

Figure 1:
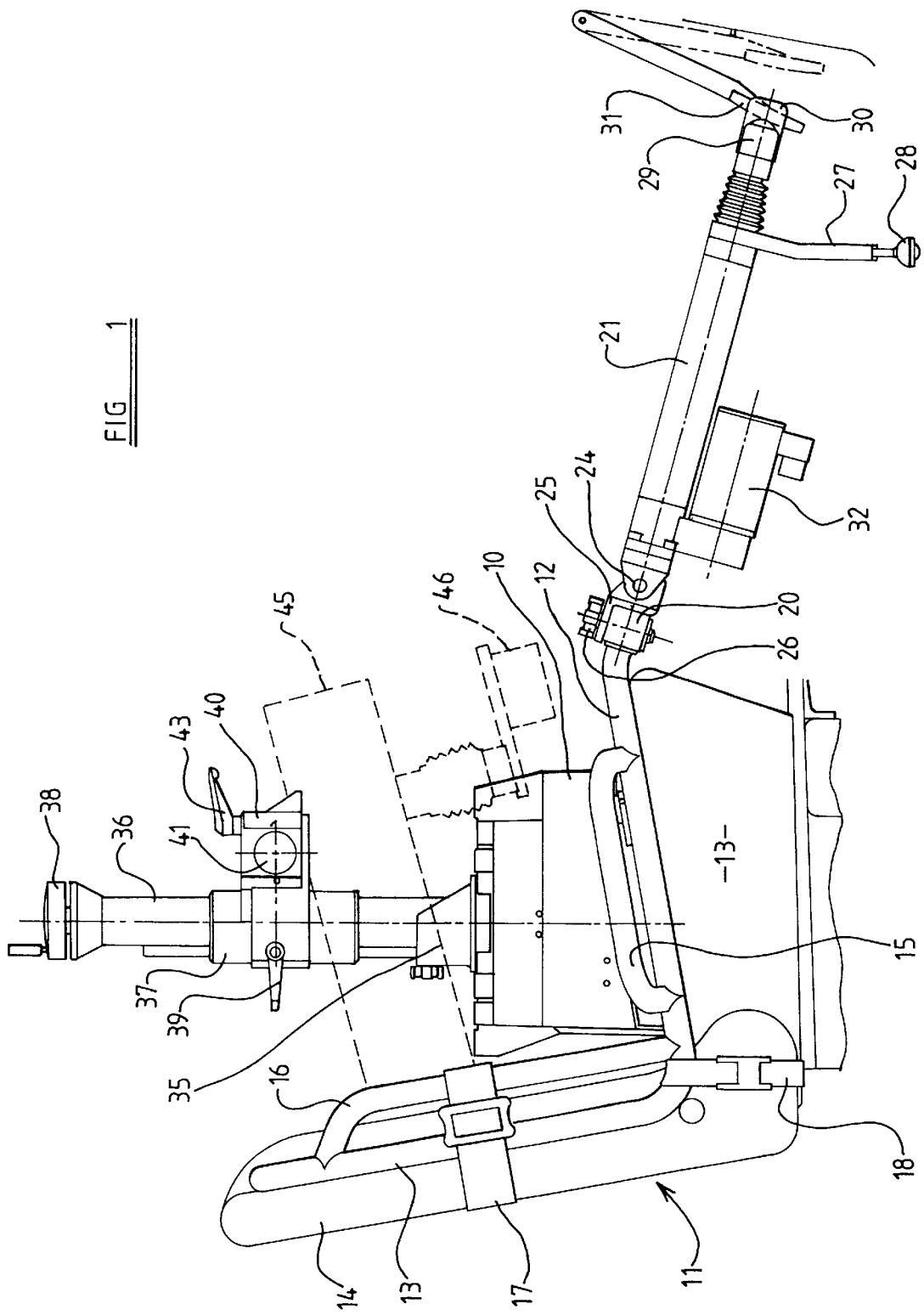
FIG. 1 is a diagrammatic lateral view of a robot in accordance with the invention, installed in a vehicle.
Figure 2:
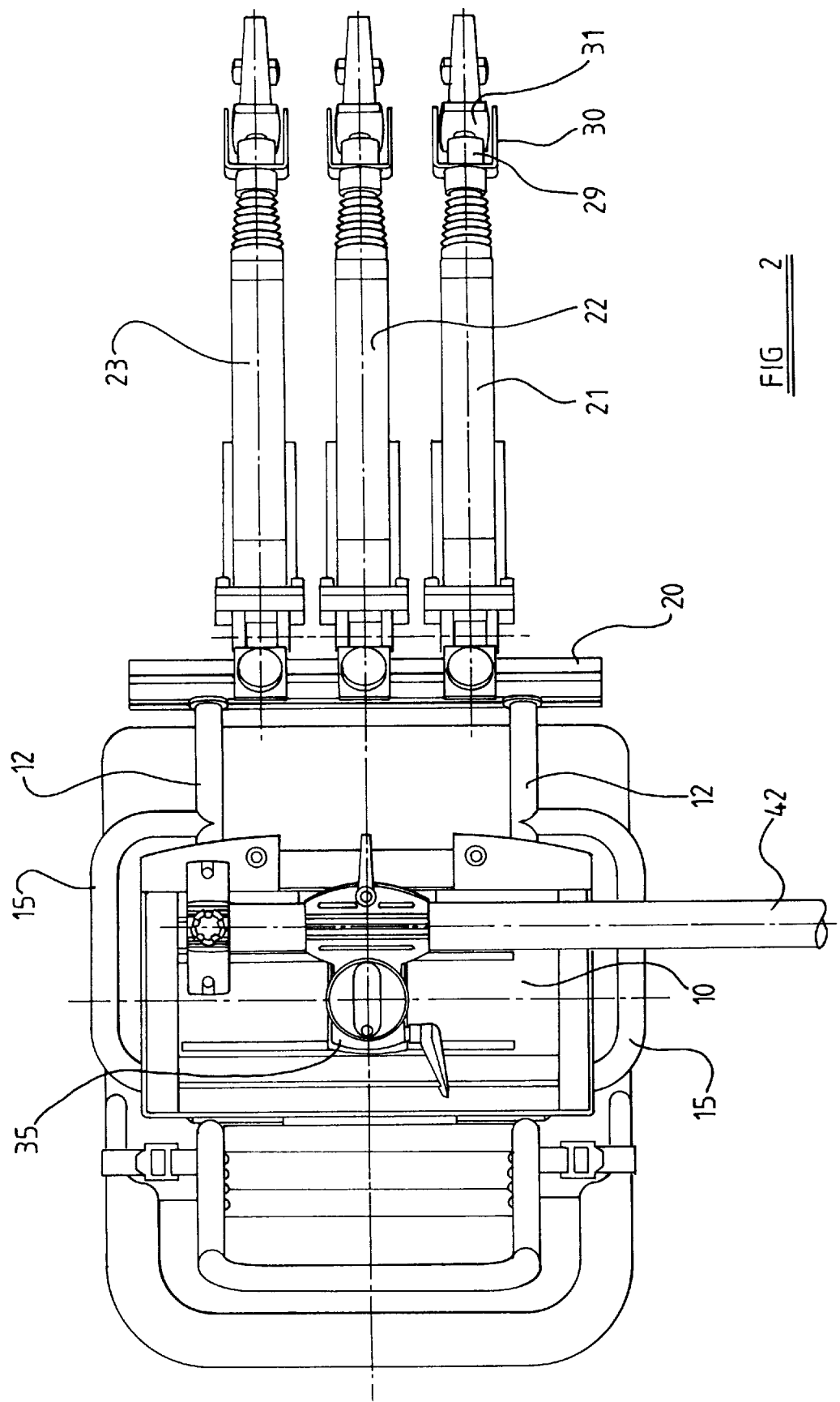
FIG. 2 is a plan view of part of the robot of FIG. 1.

Referring firstly to FIGS. 1 and 2 of the drawings, a robot device for simulating driving of a motor vehicle comprises a base 10 which in the drawings is shown supported on a driver's seat indicated generally at 11 of the vehicle. The base 10 is secured to a frame of tubular metal such as steel, comprising two parallel members 12 which rest on the squab 13 of the seat and which curve into upwardly extending portions 13 which rest against the backrest 14 of the seat. The parts 12 have respective outwardly extending and upwardly inclined frame portion 15 secured thereto, which rest against upwardly inclined outermost parts of the seat squab 13. The frame parts 13 have further parts 16 secured thereto, and the frame arrangement is such that the base 10 is able to be located relatively firmly in a driver's seat of typical shape and configurations such as is found in a modem motor vehicle of the passenger car type.

The robot is held to the seat 11 by straps 17, 18 which are passed around appropriate parts of the frame of the robot and of the seat, the straps having buckles enabling them to be tightened and held when tightened.

The frame members 12 extend forwardly, and beyond the front edge of the seat squab 13 they are connected to a substantially horizontally oriented actuator support bar 20. The support bar 20 carries three linear actuators 21 to 23 for operating pedal controls namely the accelerator, brake and clutch of the vehicle. The actuators 21 to 23 are adjustable in respect of their positions lengthwise of the member 20, i.e. laterally of the vehicle, and this is shown in FIG. 1 in respect of the actuator 21 which is pivotally secured at 24 to a mounting bracket 25 which engages and is movable along the member 20, and is able to be clamped in position relative thereto by a clamping screw tightenable by a knob 26. At their ends remote from the member 20, the actuators are supported by respective support members as 27 each with an adjustable foot 28 which rests on the footwell floor of the vehicle. The output members of the respective actuators, as shown at 29 for the actuator 21, have generally U-shaped alignment members as 30 which extend to opposite sides of the respective control pedals as indicated at 31, thereby ensuring that the actuators remain in operative engagement with the pedals.

The actuators 21 to 23 may be ball-screw type actuators, operated by electric motors as seen at 32 for the actuator 21.

The base 10 of the robot contains a first actuating means which preferably is a ball-screw type actuator having a lead screw element rotatable by an electric motor and an output element connected to the screw so as to be movable linearly thereby. The output element of such actuator is connected to a member 35 which is movable with appropriate guiding means across the base 10 in the direction transversely of the vehicle. The actuator has a position-measuring device associated therewith, to provide an output signal indicating the position of the output element of the actuator, and thereof the member 35, relative to the base 10. The member 35 carries a post 36 and a support sleeve 37 is movable up and down the post 36 by a lead screw controlled by a handle 38. When the required position of the sleeve 37 relative to the post 36 has been set, such position may be retained by clamping by a clamping handle 39. The sleeve 37 carries a bracket 40 with an opening 41 for receiving a support tube shown in FIG. 2 at 42. The support tube 42 is held to the bracket 40 by clamping by a clamping handle 43. As illustrated the support tube 42 extends transversely of the vehicle parallel to the directional movement of the member 39 under the control of the first actuating means within the base 10.

Figure 3:
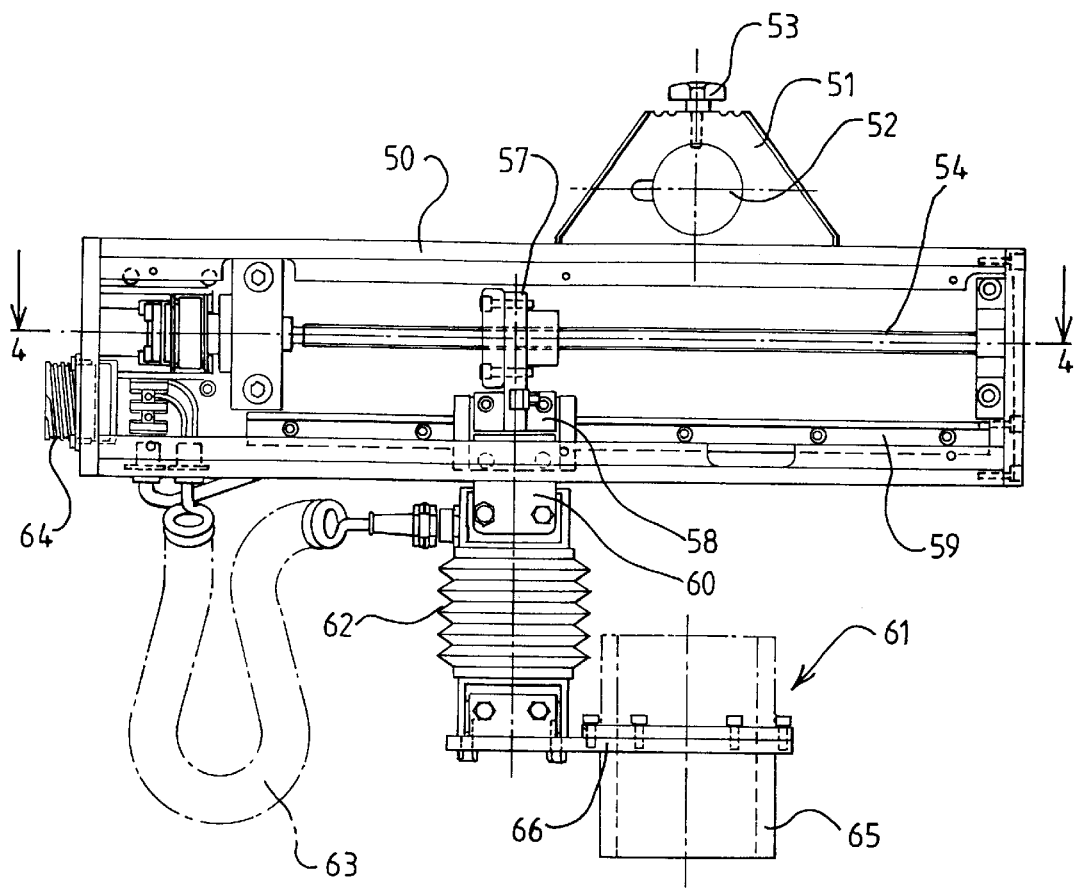
FIG. 3 is a lateral view, with a side cover removed, of part of the robot.
Figure 4:
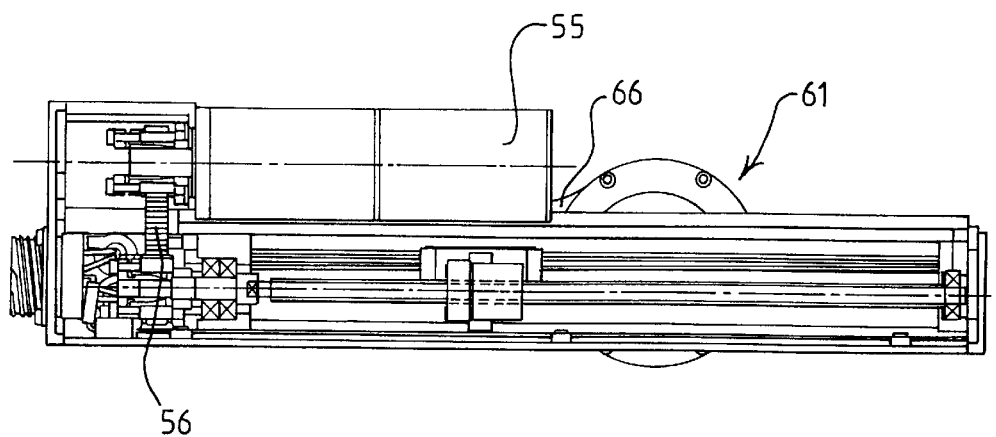
FIG. 4 is a section on the line 4—4 of FIG. 3.

The support tube 42 carries an assembly of a second actuator means and associated components which assembly is shown in greater detail in FIGS. 3 and 4. This assembly is shown in outline and indicated at 45 in FIG. 1 and from FIG. 1 it will be appreciated that the shift member (46) to be described hereafter is positioned so as to be able to engage the knob on the end of a gear shift lever of the vehicle where such lever is normally provided, for operating such lever to shift the gears of the vehicle. It will be appreciated that by virtue of the various possibilities for adjustment afforded by the constructional details described above, the assembly 45 will be able to be positioned and orientated such as to be able to operate the gear lever in the required paths of movement to select all the gears required to be selected. It will be noted that in FIG. 1 the assembly 45 is illustrated and disposed in an orientation at an inclination to the horizontal, which will in general be adopted when the gear lever is inclined rearwardly of the vehicle when in the neutral plane of its path of movement. Nevertheless the movement provided by the second actuating means incorporated in the assembly 45 is still predominantly in the fore and aft direction of the vehicle.

Referring now to FIGS. 3 and 4, the assembly 45 comprises a housing 50 of elongate configuration, provided with an upwardly projecting bracket 51 with an aperture 52 for receiving the support tube 42. A clamping screw 53 provides for fixing the housing 50 to the support tube 42 in a required position and orientation. The second actuating means of the assembly 45 is a ball-screw type of actuator, comprising a lead screw 54 supported in the housing 50 and rotatable by an electric motor 55 through the driving intermediary of a transmission belt 56. A nut assembly 57 engages the lead screw 54 so as to be movable lengthwise thereof when the screw is rotated, and the nut assembly is connected to an output member 58 which is guided for linear movement along a guide track 59 supported in the housing 50. Associated with the actuating means is a position measuring device, e.g. a potentiometer of linear or rotary type operatively connected with the actuating means so as to provide an output signal indicating the actual position of the output member 58 relative to the housing 50.

The output member 58 carries a plate 60 extending downwardly through a slot in a lower part of the housing 50, and the plate 60 is connected to a shift member indicated generally at 61 through the intermediary of a connecting member, which is not shown in the drawing as it is disposed within a protective bellows 62, and with which is associated force-measuring means. Such force-measuring means is arranged to measure the force exerted between the shift member 61 and the vehicle's gear shift lever in each of two directions substantially orthogonal to one another, such directions being the direction of the longitudinal axis of the lead screw 54 and a direction transverse thereto and substantially parallel to the support tube 42. Such directions correspond substantially to the directions of movement of the gear shift lever in its gear selection planes and its neutral plane, respectively substantially fore and aft of the vehicle (although the assembly 45 may not be exactly horizontally orientated) and transversely of the vehicle. The force-measuring means may comprise a load cell or cells of any appropriate type having regard to the nature and operating conditions of the apparatus, e.g. of the strain gauge type arranged to detect deflection of the connecting member in directions perpendicular to one another. A connecting member having force-measuring means associated therewith is available as a proprietary component; an example thereof is a dual axis load cell by Maywood Instruments, part no. 9800-03600. An electrical connection to such force-measuring means is provided by way of a flexible cable 63, and a socket 64 is provided for electrical connection to the cable 63 to the force-measuring means, and further to the electric motor 55, and to the position measuring device associated with the actuating means.

The shift member indicated generally at 61 comprises a tubular collar 65 held by a mounting bracket 66 bolted to the bottom of the connecting member at the lower end of bellows 62. The size of the internal aperture of the collar 65 is sufficient to receive a gear lever knob of typical size with some clearance all round. As illustrated, the collar 65 depends downwardly from the bracket 66 but it may alternatively be connected to the bracket 66 so as to extend upwardly therefrom as shown in broken lines in FIG. 3.

The principal mechanical components of the robot in accordance with the invention have now been described. It will be appreciated that, in use, operation of the first actuating means incorporated in the base 10 causes movement of the assembly shown in FIGS. 3 and 4 as a whole in the direction transversely of the vehicle, and thus when engaged with the gear shift lever of the vehicle and such lever is in the neutral plane, corresponding with such movement of the gear lever.

Operation of the actuating means shown in FIGS. 3 and 4 moves the gear lever forwardly or rearwardly in whichever one of the gear selection planes the lever has been set in by the transverse movement aforesaid, to cause required gears to be selected.

A robot in accordance with the invention further comprises a programmable control means which incorporates a microprocessor or microprocessors and appropriate memory and programming facilities to enable it to operate generally as described hereafter. Such a control means receives, from the actuating means of the robot, position signals indicating the position of the respective actuating means, and also signals representing the force exited between the shift member of the robot and the gear lever in orthogonal directions corresponding to movement of the lever in the neutral plane and the gear selecting planes.

Figure 5:
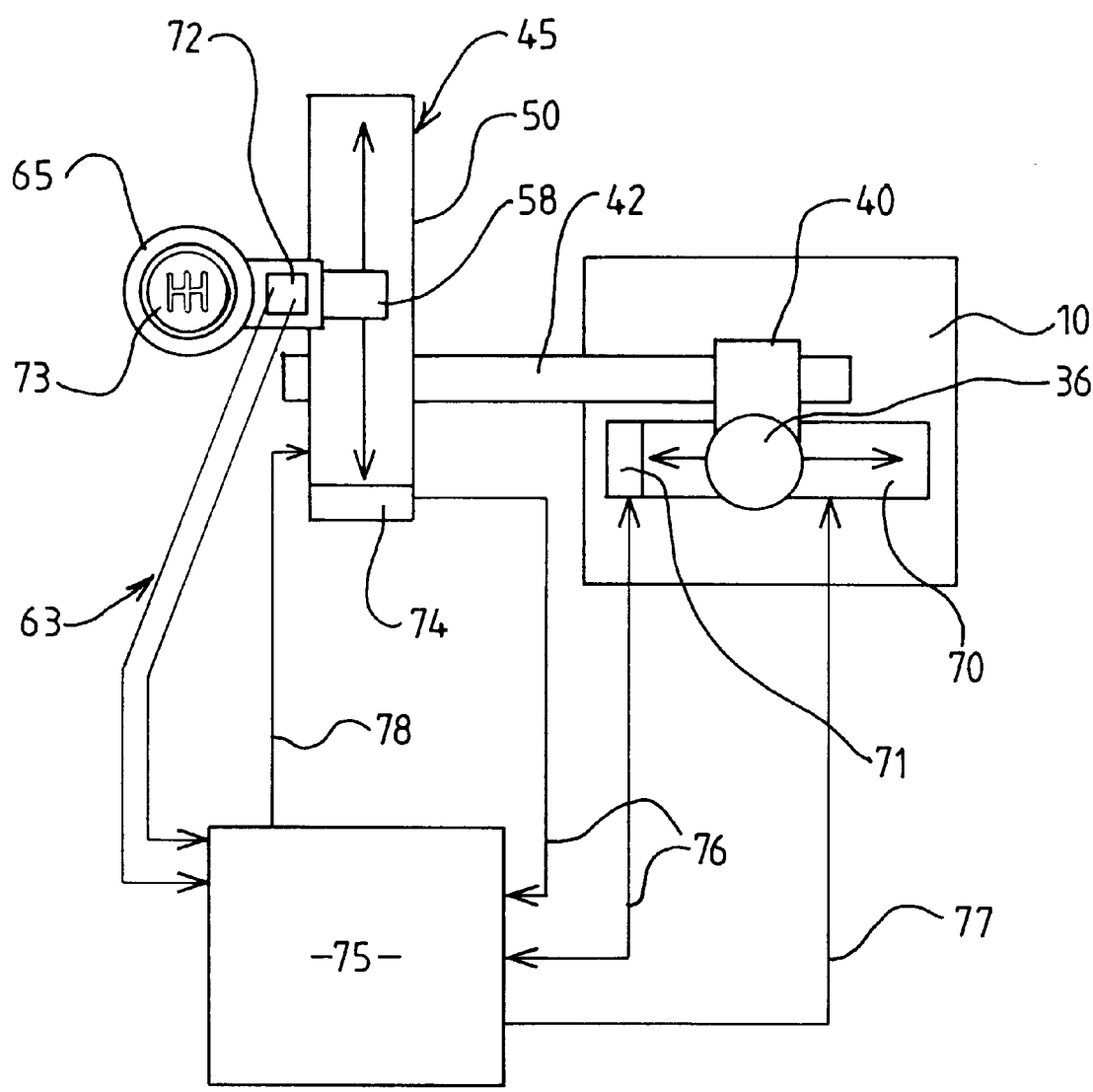
FIG. 5 is a diagrammatic representation of the robot and control system therefor.

FIG. 5 shows, diagrammatically, the configuration of the robot in terms of its principal components and the relationship thereof with the control means. In FIG. 5, the base 10 is depicted and on it the first actuating means is indicated at 70. The position-measuring device associated with the first actuating means 70 is indicated at 71, whilst the post 36 connected to the output element of the actuator 70 is shown together with the bracket 40 and support tube 42 carried thereby. The support tube 42 carries the second actuator means whose housing is indicated at 50 and whose output member 58 is shown and is connected by way of a connecting member with associated dual axis load cell 72 to the collar 65 which receives a gear lever knob shown at 73. The position measuring device, e.g. a potentiometer of the second actuating means in the assembly 45 is indicated at 74.

The programmable control means of the robot is indicated at 75, and it receives, by connections 76, signals from the position measuring devices of the two actuating means and indicating the position of the output members thereof. By connections 63 it receives from the load cell 72 signals representing the force exerted between the shift member of the robot and the gear lever knob in orthogonal directions corresponding to movement of the lever in the neutral plane and the gear selection planes. It provides output signals by way of connections 77, 78, to the two actuating means to cause them to move their respective output members and thus cause such movement of the shift member and hence the gear lever in the two orthogonal directions. Typical operation of the control means will now be described.

When the robot is first installed in a vehicle, a setting up procedure has to be undertaken. Firstly the robot is adjusted physically so that the path of movement of the shift member 61 is going to be able most effectively to operate the gear shift lever of the vehicle, and thereafter a process must be undertaken whereby the control means "learns" substantially the exact movements required to select the different gears.

In the "learning" process the gear shift lever is initially moved transversely of the vehicle in the neutral plane by operation of the first actuating means, but with a small component of fore and aft movement obtained by correspondingly small operation of the second actuating means. By noting the position of the first actuating means when the measured force exerted between the shift member and gear lever suddenly increases, the lateral limits of movement of the lever in the neutral plane will be detected and the positions of the first actuating means corresponding to such limits will be recorded. By fore and aft movement of the shift member in such extreme lateral positions, the limits of the range of movement in the fore and aft direction can be detected and then the mid-point in such direction derived. Thus the path of movement of the shift member to move the gear lever in the neutral plane is learnt and stored in the control means. The learnt path of movement will include a correction for the situation if the robot is not mounted squarely in the vehicle seat.

In most vehicle gear shift systems, the gear lever is spring biased to the central gear selection plane which normally corresponds to third and fourth gears. The force-measuring means of the robot enables the position of this plane to be learnt, and then the lever is moved forwardly and rearwardly in this plane with the force measuring means giving an indication of the limits of such movement of the lever. All these movements of the shift member to move the gear lever are repeated one or more times, until consistent results are obtained and recorded in a memory of the control means.

Once the required path of movement of the shift member to select the required gears has been learnt, the control means causes the gears to be selected in a sequence with which the control means has been programmed. For example, if first gear is required to be selected, the shift member will be moved in the neutral plane primarily by operation of the first actuating means but possibly with a component of movement of the second actuating means superimposed thereon, until the limit of such movement is reached and the shift member is positioned to, move the lever in the gear selection plane containing first gear. Such movement of the shift member initially takes place quickly but when the extreme position is approached the speed of movement is reduced until the force measuring means detects that the extreme position has actually been reached, whereupon movement ceases. A predetermined force is maintained on the shift member to hold it in such position. The shift member is then moved, primarily by operation of the second actuating means, to move the gear lever in the gear selection plane until the gear is selected, such movement again being rapid at first and then slowing as the position of selection of the gear is approached and ceasing when the gear has been selected, as indicated once again by the force-measuring means. In the course of this movement the predetermined force in the direction of the neutral plane is maintained on the shift member, which simulates the action a human driver will take when selecting a gear. Then the shift member is caused to retreat slightly from its extreme gear selection position, so that a small clearance is established in all directions between the shift member and the gear lever knob. Thus the gear lever is permitted to vibrate and/or move slightly as the vehicle changes between the drive and overrun conditions or the torque being transmitted by the gearbox changes.

Preferably when a gear has been selected the control means causes the robot to assume a "zero force" condition, wherein if the gear lever makes contact with the shift member the latter will be moved until any force imposed on the shift member is reduced to zero. This may occur under changes in torque being transmitted by the vehicle's gearbox, or in an extreme case if there is a fault the vehicle would be permitted to "jump out of gear" completely, i.e. the gear be disengaged with a corresponding movement of the gear shift lever back towards the neutral plane. If an excessive such movement of the shift member is detected, then the control means might be programmed to correct the situation and re-engage the gear.

Other gears would be selected in analogous manner in accordance with an overall vehicle-operating procedure which has been programed into the control means of the robot. In the course of this, it will be appreciated that the control pedal operating actuators of the robot will also be caused to operate in an appropriate sequence, thereby completely simulating the driving of the vehicle.

The features disclosed in the foregoing description, or the following claims, or the accompanying drawings, expressed in their specific forms or in terms of a means for performing the disclosed function, or a method or process for attaining the disclosed result, as appropriate, may, separately or in any combination of such features, be utilised for realising the invention in diverse forms thereof.

What is claimed is:

1. A robot for operating at least a gear shift lever of a motor vehicle, said gear shift lever being movable in a gear shift pattern including components of movement in two directions substantially orthogonal to one another, comprising:

a base adapted to be mounted in a substantially fixed position in the vehicle;

a shift member movably supported relative to the base and adapted to engage the gear shift lever, for moving the gear shift lever in said gear shift pattern;

actuating means for causing the shift member to move in a pattern of movement corresponding to said gear shift pattern, said movement including components substantially in said two directions;

programmable control means for causing said actuating means to be operated in a predetermined manner to cause a predetermined sequence of gear shifts;

means for measuring the force exerted between the shift member and the gear shift lever in each of the two directions of said components of movement of the shift member and for providing output signals representing said forces to said control means; and said programmable control means utilizing said output signals for controlling operation of the actuating means.

2. A robot according to claim 1 wherein said means for measuring the forces exerted between the shift member and gear shift lever in said two directions comprises means arranged to measure corresponding force components in a member connecting the shift member to the actuating means.

3. A robot according to claim 2 wherein said force-measuring means comprises at least one load cell disposed on or in relation to said connecting member.

4. A robot according to claim 1 wherein said actuating means comprises first actuating means for causing movement of the shift member in the direction transversely of the vehicle, and second actuating means for causing movement of the shift member in the direction fore and aft of the vehicle.

5. A robot according to claim 4 wherein each of the first and second actuating means comprises a screw-type device, having an output element movable linearly and engaging a lead screw element rotatable by an electric motor.

6. A robot according to claim 4 wherein each actuating means has associated therewith a means for detecting the position of the output member and for providing a signal representing such position to the control means of the apparatus.

7. A robot according to claim 1 wherein the base of the robot is adapted to be mounted in the vehicle by being supported on the driver's seat thereof.

8. A robot according to claim 7 wherein the base is provided with means for resting against a squab and a backrest of the seat, and is adapted to be secured thereto by fastening means.

9. A robot according to claim 4 wherein the first actuating means is disposed in the base such that the output member thereof is movable, in use, transversely of the vehicle and said output member is connected to means which supports the second actuating means which is arranged to cause movement of the shift member in the fore and aft direction of the vehicle.

10. A robot according to claim 9 wherein the support means for the second actuating means includes provision for adjustment of the position and orientation of the second actuating means, for enabling it to operate the gear lever correctly in a particular vehicle in which the robot is mounted.

11. A robot according to claim 1 further including respective actuating means for pedal controls of the vehicle.

12. A robot according to claim 11 wherein the pedal control actuating means comprises linear actuators which are each adjustably supported relative to the base of the robot.

13. A robot according to claim 12 wherein said actuators are each further supported at positions remote from the base so that they are able to cooperate with the pedal controls of the vehicle.

14. A robot according to claim 1 wherein after a gear has been selected, the control means causes the shift member to be moved to reduce to zero any force exerted thereon by the gear lever.

* * * * *